(12) United States Patent
Okada

(10) Patent No.: US 8,650,347 B2
(45) Date of Patent: Feb. 11, 2014

(54) ARBITRATION DEVICE, ARBITRATION METHOD, AND ELECTRONIC APPARATUS

(75) Inventor: Masaki Okada, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 615 days.

(21) Appl. No.: 12/540,844

(22) Filed: Aug. 13, 2009

(65) Prior Publication Data

US 2010/0057962 A1 Mar. 4, 2010

(30) Foreign Application Priority Data

Aug. 28, 2008 (JP) ................................ 2008-219922

(51) Int. Cl.
*G06F 13/364* (2006.01)

(52) U.S. Cl.
USPC .......................................................... 710/116

(58) Field of Classification Search
USPC .................. 710/264, 265, 116, 123, 240–244
See application file for complete search history.

(56) References Cited

U.S. PATENT DOCUMENTS

| | | | | |
|---|---|---|---|---|
| 5,241,632 A * | 8/1993 | O'Connell et al. | ........... | 710/117 |
| 5,440,752 A * | 8/1995 | Lentz et al. | ................... | 710/123 |
| 5,623,672 A * | 4/1997 | Popat | ............ | 710/240 |
| 5,729,702 A * | 3/1998 | Creedon et al. | ............... | 710/111 |
| 5,754,800 A * | 5/1998 | Lentz et al. | ................... | 710/116 |
| 5,778,200 A * | 7/1998 | Gulick | ........................ | 710/113 |
| 5,832,278 A * | 11/1998 | Pham | ........................ | 710/243 |
| 5,862,355 A * | 1/1999 | Logsdon | ....................... | 710/116 |
| 5,931,936 A * | 8/1999 | Chung et al. | .................. | 710/263 |
| 5,968,154 A * | 10/1999 | Cho | .............................. | 710/119 |
| 6,088,421 A * | 7/2000 | Rao et al. | ........................ | 377/44 |
| 6,122,693 A * | 9/2000 | Gutta et al. | .................... | 710/107 |
| 6,137,838 A * | 10/2000 | Miyagoshi et al. | ...... | 375/240.26 |
| 6,674,306 B1 * | 1/2004 | Reynolds | ........................ | 326/94 |
| 6,735,653 B2 * | 5/2004 | O Mathuna et al. | .......... | 710/105 |
| 6,778,557 B1 * | 8/2004 | Yuki et al. | ..................... | 370/468 |
| 6,831,922 B1 * | 12/2004 | Shimada | ...................... | 370/403 |
| 7,065,595 B2 * | 6/2006 | Drerup et al. | .................. | 710/117 |
| 7,120,113 B1 * | 10/2006 | Zhang et al. | .................. | 370/229 |
| 7,143,219 B1 * | 11/2006 | Chaudhari et al. | ........... | 710/111 |
| 7,284,080 B2 * | 10/2007 | Lin et al. | ....................... | 710/244 |
| 7,350,004 B2 * | 3/2008 | Fukuyama et al. | .......... | 710/241 |
| 7,558,736 B2 * | 7/2009 | Thalanany et al. | ........... | 704/275 |
| 7,650,454 B2 * | 1/2010 | Shukla et al. | .................. | 710/241 |
| 7,657,712 B2 * | 2/2010 | Lentz et al. | ................... | 711/151 |
| 7,685,346 B2 * | 3/2010 | Teh et al. | ....................... | 710/244 |
| 8,065,447 B2 * | 11/2011 | Ryu et al. | ....................... | 710/22 |
| 2002/0059508 A1* | 5/2002 | Lentz et al. | ..................... | 712/15 |
| 2005/0204085 A1 | 9/2005 | Fukuyama et al. | | |
| 2005/0223147 A1* | 10/2005 | Hellwig et al. | ............... | 710/110 |
| 2008/0065801 A1 | 3/2008 | Fukuyama et al. | | |

FOREIGN PATENT DOCUMENTS

| | | | |
|---|---|---|---|
| EP | 2141600 A1 * | 1/2010 | .............. G06F 13/16 |
| JP | 2003-271545 | 9/2003 | |
| JP | 2005-258867 | 9/2005 | |
| JP | 2007-26022 | 2/2007 | |

OTHER PUBLICATIONS

Japanese Office Action mailed Apr. 24, 2012 issued in corresponding Japanese Patent Application No. 2008-219922.

* cited by examiner

*Primary Examiner* — Paul R Myers
(74) *Attorney, Agent, or Firm* — Staas & Halsey LLP

(57) ABSTRACT

An arbitration device and method including validating a second signal after a first signal is selected for a given number of times when the first signal and the second signal conflict, where the first signal has a first priority based on a priority order corresponding to a plurality of processes and the second signal has a second priority lower than the first priority.

15 Claims, 9 Drawing Sheets

FIG. 4

| PRIORITY FLAG | VALID SIGNAL 1 | VALID SIGNAL 2 | SELECTION RESULT |
|---|---|---|---|
| 0 | 1 | 0 | VALID SIGNAL 1 |
| 0 | 1 | 1 | VALID SIGNAL 1 |
| 0 | 0 | 1 | VALID SIGNAL 2 |
| 0 | 0 | 0 | NOT APPLICABLE |
| 1 | 0 | 1 | VALID SIGNAL 2 |
| 1 | 1 | 1 | VALID SIGNAL 2 |
| 1 | 1 | 0 | VALID SIGNAL 1 |
| 1 | 0 | 0 | NOT APPLICABLE |

FIG. 5

| INTER-LEVEL ARBITRATION SIGNAL 1 | INTER-LEVEL ARBITRATION SIGNAL 2 | VALID SIGNAL 3 | SELECTION RESULT |
|---|---|---|---|
| 1 | 0 | × | CHANNEL NUMBER 1 |
| 1 | 1 | × | CHANNEL NUMBER 1 |
| 0 | 1 | × | CHANNEL NUMBER 2 |
| 0 | 0 | 1 | CHANNEL NUMBER 3 |
| 0 | 0 | 0 | NOT APPLICABLE |

ARBITRATION DEVICE, ARBITRATION METHOD, AND ELECTRONIC APPARATUS

CROSS-REFERENCE TO RELATED APPLICATIONS

This application is based upon and claims the benefit of priority of the prior Japanese Patent Application No. 2008-219922, filed on Aug. 28, 2008, the entire contents of which are incorporated herein by reference.

FIELD

The embodiment(s) discussed herein is related to an arbitration device, an arbitration method, and an electronic apparatus.

BACKGROUND

An electronic apparatus such as a digital still camera generally includes data processing parts different from one another and a data processing memory. Each of the processing parts reads desired data from the memory and writes the processed data to the memory. Since the memory is accessed asynchronously for the processes, access requests from the processing parts to the memory may conflict. To resolve the conflict, an arbitration device operable to arbitrate the access requests from the processing parts to the memory may be provided between the processing parts and the memory.

As illustrated in FIG. 1, an arbitration device 101 is coupled between processing parts, which are not depicted, and a memory 102. The arbitration device 101 includes a first arbitration function part 111, a second arbitration function part 112, and a bus controller 121.

Each of selection parts 111a and 111b of the first arbitration function part 111 sequentially selects an input terminal after every given period to output a signal input to the selected input terminal. Similarly, each of selection parts 112a and 112b sequentially selects an input terminal after every given period to output a signal input to the selected input terminal. When the processing parts access the memory 102 for desired processes, request signals S101 to S107 are output from the processing parts to be input to the selection parts 111a, 111b, 112a, and 112b. The bus controller 121 provides the requesting processing parts with the right to use a shared bus coupled to the memory 102 in response to the request signals output from the first arbitration function part 111 and the second arbitration function part 112.

Each of the first arbitration function part 111 and the second arbitration function part 112 outputs a request signal selected from the request signals S101 to S107 in accordance with the priorities depending on the configurations, for example, the coupling states of the selection parts 111a, 111b, 112a, and 112b. For example, the first arbitration function part 111 processes the access requests from two processing parts coupled to the first selection part 111a in accordance with a first priority and processes the access requests from two other processing parts coupled to the second selection part 111b in accordance with a second priority lower than the first priority.

By the way, in the electronic apparatus, processing parts that operate or obtain higher priorities may change depending on a state of the process being performed. For example, in a typical digital still camera, the processing parts that operate when image data are recorded and the processing parts that operate when the recorded image data are processed are different. However, in the arbitration device 101, each of the requests from the processing parts is validated for a period of time depending on the configuration of the arbitration function part 111 or 112. For example, the first selection part 111a processes the input request signals S101 and S102 in accordance with substantially the same priority. However, the time taken for the selection of the input terminal may remain unchanged even when the other processing part does not operate. In other words, resource is consumed also for the inactive processing part and as a result, the limited resource may not be used efficiently.

To address the problems, the processing parts to which the arbitration function parts 111 and 112 are coupled are changed, that is, the allocation of the terminals to which the request signals are input is changed. For example, in the data processing system discussed in Japanese Patent Application Laid-Open Publication No. 2003-271545, a selection part of signals for requesting the right to use a bus allocates request signals provided by modules to one of intra-group arbiters in accordance with group values stored in a group setting register in a group setting part. Each of the intra-group arbiters includes a round-robin table and outputs one of the request signals input in accordance with the arbitration contents of the table. An inter-group arbiter arbitrates the request signals output from the intra-group arbiters in accordance with the contents for performing fixed priority arbitration, which are stored in the internal table to output the arbitrated request signals. In Japanese Patent Application Laid-Open Publication No. 2003-271545, a data processing system that may set either the fixed priority arbitration or the round-robin arbitration for the inter-group arbiter is also discussed.

However, in a typical data processing system, high-priority requests may be mainly selected and low-priority requests may be hardly accepted when the inter-group arbiter is set to perform the fixed priority arbitration. Alternatively, the inter-group requests may be equalized and the high-priority requests may be less likely to be accepted when the inter-group arbiter is set to perform the round-robin arbitration in the typical data processing system.

SUMMARY

According to an aspect of an embodiment, an arbitration device includes a first arbiter validating a second signal after a first signal is selected for a given number of times when the first signal and the second signal conflict, where the first signal has a first priority based on a priority order corresponding to a plurality of processes and the second signal has a second priority lower than the first priority.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 illustrates operations of an inter-level arbiter of an arbitration circuit as exemplarily shown in FIG. 3;

FIG. 5 illustrates operation(s) of a channel determination part of an arbitration circuit as exemplarily shown in FIG. 3;

DETAILED DESCRIPTION OF EMBODIMENTS

Figure 1:
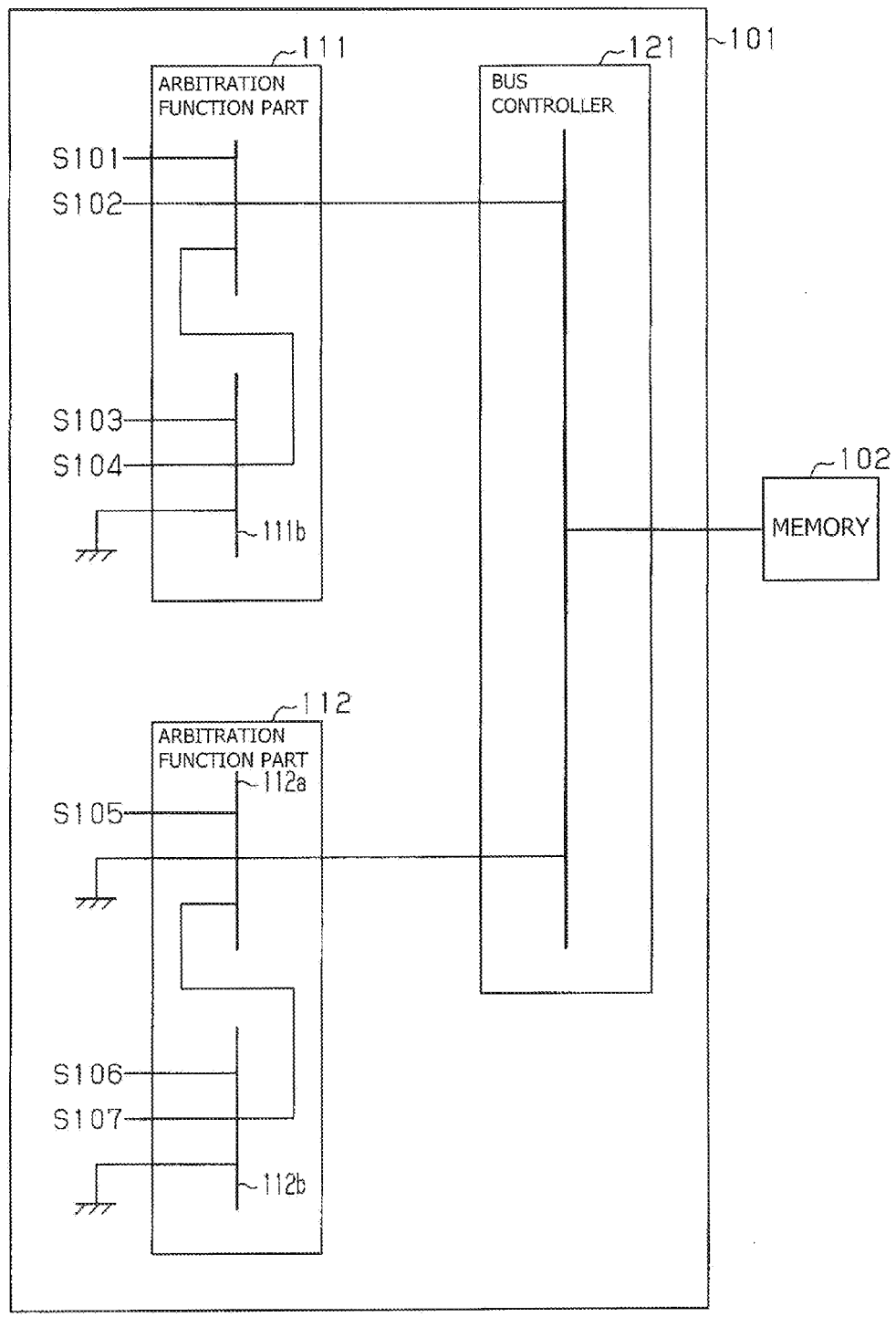
FIG. 1 illustrates a typical arbiter.

Reference will now be made in detail to the embodiments, examples of which are illustrated in the accompanying drawings, wherein like reference numerals refer to the like elements throughout. The embodiments are described below to explain the present invention by referring to the figures.

An embodiment is described below with reference to FIGS. 2 to 7.

Figure 2:
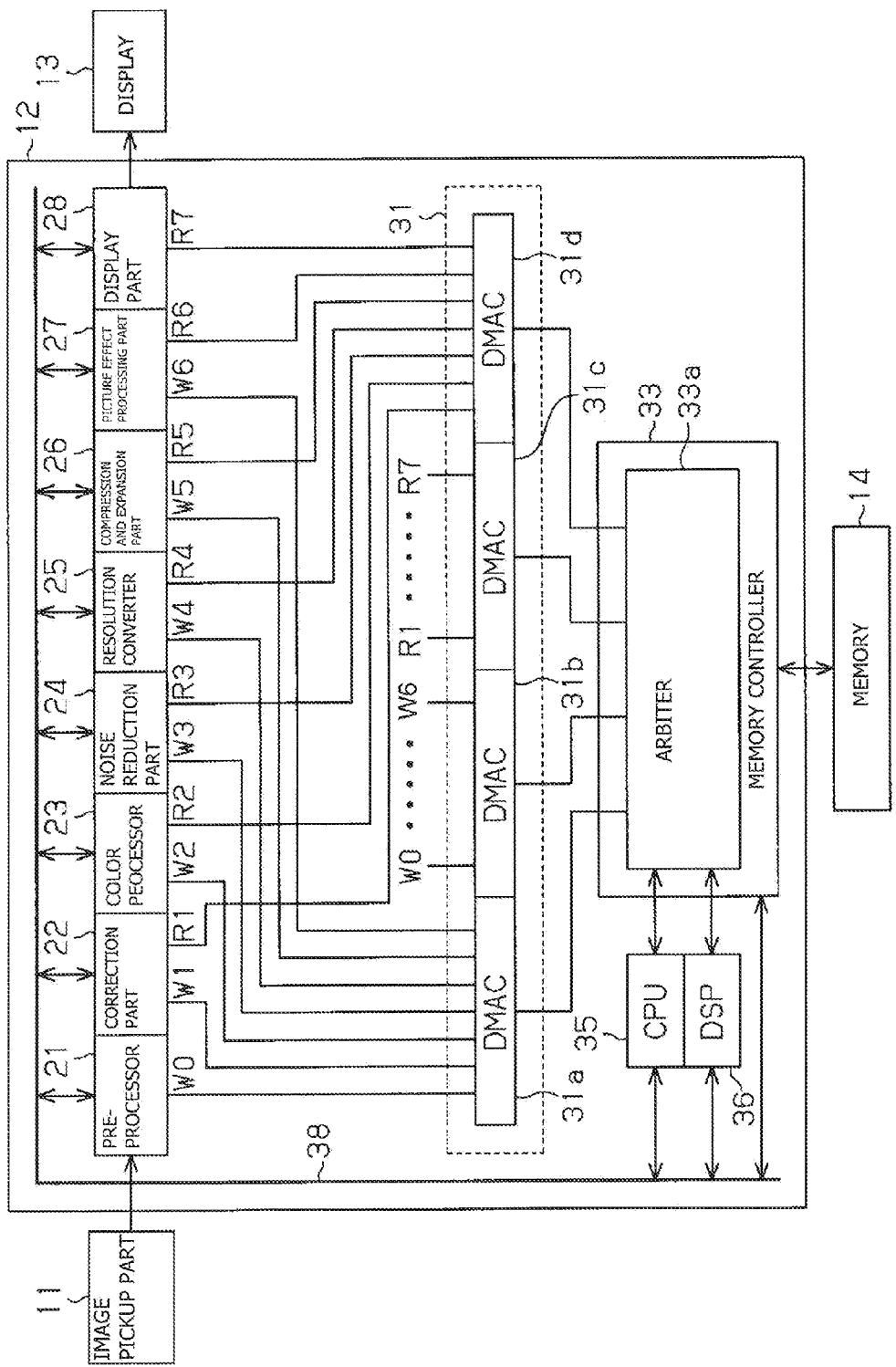
FIG. 2 illustrates an electronic apparatus according to an aspect of an embodiment.

FIG. 2 is a schematic view of a configuration of an electronic apparatus. The electronic apparatus may be a digital still camera, for example, and includes an image pickup part 11 as an acquisition part, a processing device 12, a display 13 as a display part, and a memory 14. The image pickup part 11 includes an image sensor, such as a charge-coupled device (CCD) or a complementary metal oxide semiconductor (CMOS) image sensor, and converts light incident on the image sensor into an electric signal to generate a frame image data to output the generated image data to the processing device 12.

The processing device 12 processes the image data output from the image pickup part 11 and stores the processed data in the memory 14. The memory 14 may be a synchronous dynamic random access memory (SDRAM), for example. The processing device 12 includes a plurality of processing parts to process the data read from the memory 14 and store the processed data in the memory 14. Further, the processing device 12 outputs the data stored in the memory 14 to the display 13. The display 13 may be a liquid crystal display (LCD) or an electroluminescence (EL) display, for example, and operates to display images based on the data output from the processing device 12. Alternatively, the display 13 may be a typical printer for displaying images on media including paper or a typical projector for displaying images on, for example, a surface of a wall.

The processing device 12 includes processing parts 21 to 28. Examples of the processing parts 21 to 28 are described in detail below. The first processing part 21 is a preprocessor to perform preprocess(es) including a white balance processing for image data output from the image pickup part 11 and the processed data may be stored in the memory 14. The second processing part 22 is a correction part to correct the data read from the memory 14 in the form of, for example, γ correction where the corrected data is stored in the memory 14. The third processing part 23 is a color processor to convert color and/or space of the data read from the memory 14 and is configured to store the converted data in the memory 14. The fourth processing part 24 is a noise reduction part to perform given process (es) to reduce noise in the data read from the memory 14 and store the processed data in the memory 14. The fifth processing part 25 is a resolution converter to perform process (es) including thinning of pixel data and data interpolation and enabled to store the processed data in the memory 14. The sixth processing part 26 is a compression and expansion part to encode and decode (compress and expand) the data read from the memory 14 using a given system, such as the JPEG system, and store the processed data in the memory 14. The seventh processing part 27 is a picture effect processing part to perform process (es) including edge enhancement for the data read from the memory 14 and store the processed data in the memory 14. The eighth processing part 28 is a display part to convert the data read from the memory 14 into the data for display and output the converted data in the memory 14. While specific types of processing parts are discussed herein, the present embodiment is not limited to any particular processing or part. Instead, requests for any processing of data by any type of computer or device may be received by the processing device 12.

As described above, the processing parts 21 to 27 store data in the memory 14. The processing parts 21 to 27 output request signals W0 to W6 that use a bus 38 to write the data to the memory 14, respectively. The processing parts 22 to 28 read the data from the memory 14. The processing parts 22 to 28 output request signals R1 to R7 that use the bus 38 to read the data from the memory 14, respectively.

The processing parts 21 to 28 form channels (DMA channels) to access the memory 14 for data transfer. Since memory 14 is shared by the processing parts 21 to 28, one of the processing parts 21 to 28 may access the memory 14 through one of the channels at a time. The processing parts 21 to 28 attempt to access the memory 14 asynchronously, that is, each of the processing parts 21 to 28 attempts to access the memory 14 independently. In still other words, the processing parts attempt to form channels simultaneously, which means that the request signals conflict to obtain the right to use the bus 38. The arbitration circuit 31 coupled to the processing parts 21 to 28 arbitrates the request signals W0 to W6 and R1 to R7 output from the processing parts 21 to 28.

The arbitration circuit 31 includes a plurality of arbitration function parts, e.g., four arbitration function parts 31a to 31d in an embodiment. The first arbitration function part 31a and the second arbitration function part 31b serve to arbitrate the request signals W0 to W6 for write operations. The third arbitration function part 31c and the fourth arbitration function part 31d serve to arbitrate the request signals R1 to R7 for read operations.

Thus, resources including the bus 38 for data transfer may be used effectively by employing the two arbitration function parts 31a and 31b for write operations and the two arbitration function parts 31c and 31d for read operations. For example, any one of the other processing parts may use the bus 38 to read or write data while the second processing part (correction part) 22 processes the data read from the memory 14. A length of the time typically taken for the access to the memory 14 differs from a length of the time that the processing parts typically take for data input or output, that is, access speeds are different from one another. Since a request signal for the next access may be accepted while any one of the processing parts accesses the memory 14, data corresponding to the request signal for the next access may be read from the memory 14 to a buffer. As a result, continuous accesses may be achieved.

A plurality of write request signals, e.g., seven in an embodiment, that is, all of the write request signals W0 to W6 output from the processing parts 21 to 27 are input to the first arbitration function part 31a. The arbitration function part 31a is set to have a plurality of priority levels and each of the priority levels is set to have at least one channel number. The channel numbers are set for the request signals input to the arbitration function part 31a. In an embodiment, the arbitration function part 31a is set to have three priority levels, for example, and each of the priority levels is set to have one or more channel numbers corresponding to at least one of the request signals W0 to W6. The channel numbers are set as signal selection information.

When two or more channel numbers are set for the priority level, the arbitration function part 31a arbitrates the requests corresponding to the channel numbers using the round-robin system (intra-level arbitration). Further, the arbitration function part 31a arbitrates the requests selected from each of the levels (inter-level arbitration). During the inter-level arbitration, a number of selections, which refers to how many times a channel number may be selected in a given period, is set for each of the levels in the arbitration function part 31a. For example, the numbers of selections of the levels may be set based on the priorities set for the levels. The higher the level is in priority, the larger number of selections the level may be set to have.

The arbitration function part 31a selects the channel numbers set for an upper level, e.g., the highest-priority level, one after another. The arbitration function part 31a selects each of the channel numbers for the number of times set for the level and selects the channel numbers set for lower-priority levels, one after another, for the numbers of times set for the levels. In other words, the arbitration function part 31a selects the channel numbers or the request signals based on a ratio among the numbers of selections set for the levels. Thus, the arbitration function part 31a selects the lower-priority request signals at a given frequency even when a number of the higher-priority request signals is large. Thereby, the lower-priority request signals may be selected as often as the higher-priority request signals and the processing part that outputs the selected request signal may obtain the right to access the memory 14, that is, the right to use the shared bus coupled to the memory 14.

Similarly, a plurality of write request signals, e.g., seven in an embodiment, that is, all of the write request signals W0 to W6 output from the processing parts 21 to 27 are input to the second arbitration function part 31b. The second arbitration function part 31b is set to have three priority levels, for example, and each of the priority levels is set to have one or more channel numbers corresponding to at least one of the request signals W0 to W6. The second arbitration function part 31b selects the channel numbers set for the priority levels, that is, the request signals based on a ratio among the numbers of selections set for the priority levels.

A plurality of read request signals, e.g., seven in an embodiment, that is, all of the read request signals R1 to R7 output from the processing parts 22 to 28 are input to the third arbitration function part 31c. The third arbitration function part 31c is set to have three priority levels, for example, and each of the priority levels is set to have one or more channel numbers corresponding to at least one of the request signals R1 to R7. The third arbitration function part 31c selects the channel numbers set for the priority levels, that is, the request signals based on a ratio among the numbers of selections set for the priority levels.

Similarly, a plurality of read request signals, e.g., seven in an embodiment, that is, all of the read request signals R1 to R7 output from the processing parts 22 to 28 are input to the fourth arbitration function part 31d. The fourth arbitration function part 31d is set to have three priority levels, for example, and each of the priority levels is set to have one or more channel numbers corresponding to at least one of the request signals R1 to R7. The fourth arbitration function part 31d selects the channel numbers set for the priority levels, that is, the request signals based on a ratio among the numbers of selections set for the priority levels.

The request signals output from the arbitration function parts 31a to 31d are input to an arbiter (a bus controller) 33a of a memory controller 33. The request signals from a central processing unit (CPU) 35 and a digital signal processor (DSP) 36 are input to the arbiter 33a. In other words, the arbiter 33a identifies the CPU 35 and the DSP 36 as processing parts. The arbiter 33a arbitrates the request signals and allows one of the processing parts to use the bus 38. The allowed processing part accesses the memory 14 through the bus 38 and the memory controller 33.

The memory controller 33 includes buffers for writing and reading data and operates to write the data to and read the data from the memory 14 using either of the buffers. Further, the memory controller 33 operates to generate an address for access to the memory 14, which depends on the processing part. For example, the resolution conversion performed by the processing part 25 includes processing the data read from the memory 14 to write the processed data into the memory 14. Thus, the memory controller 33 generates a read address indicating desired data and a write address for writing the processed data.

The CPU 35 controls operations of the processing parts in accordance with operations of an operating part, which is not depicted. The CPU 35 writes signal selection information depending on the operations to be performed to the arbitration function parts 31a to 31d. The operations include, for example, shooting operation, visual display operation, and data conversion operation. The priority order of the request signals output from the processing parts 21 to 28 is set based on the signal selection information. That is, the processing device 12 sets the priority order of the processing parts 21 to 28, which depends on the operations to be performed. The arbitration function parts 31a to 31d of the arbitration circuit 31 arbitrate the request signals in accordance with the written signal selection information.

Now, a configuration of the first arbitration function part 31a is described.

Figure 3:
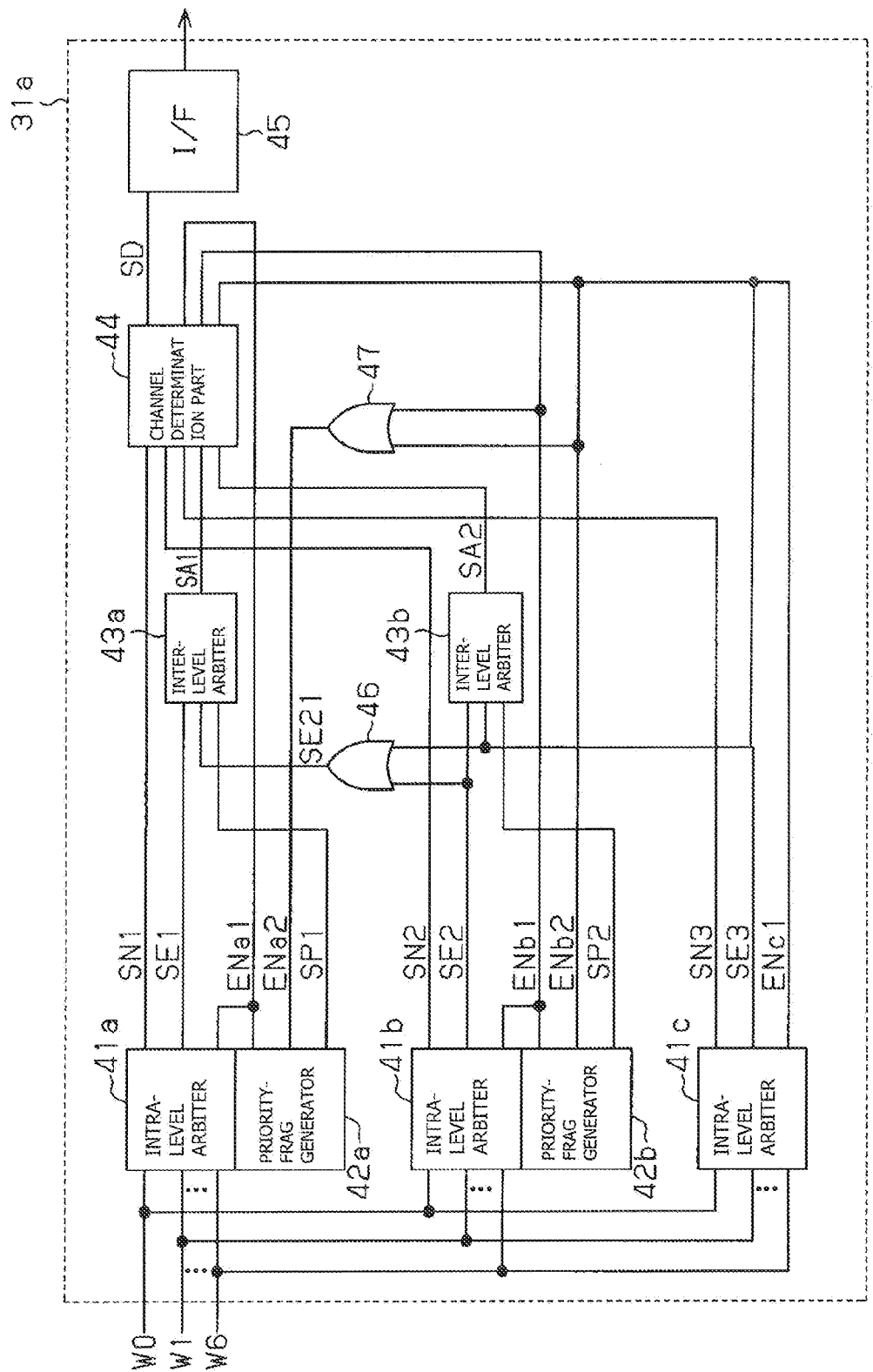
FIG. 3 illustrates an arbitration circuit of an electronic apparatus as exemplarily shown in FIG. 2.

As illustrated in FIG. 3, the arbitration function part 31a includes a plurality of intra-level arbiters, e.g., three intra-level arbiters 41a to 41c corresponding to the set levels. In an embodiment, the first arbiter 41a is set to have a first priority, e.g., the highest priority, the second arbiter 41b is set to have a second priority, and the third arbiter 41c is set to have a third priority, e.g., the lowest priority.

The write request signals W0 to W6, that is, all of the write request signals output from the processing parts 21 to 27 are input to each of the intra-level arbiters 41a to 41c. In addition, first enable signals ENa1, ENb1, and ENc1 are input to the intra-level arbiters 41a to 41c, respectively. Each of the first enable signals ENa1, ENb1, and ENc1 indicates whether or not the right to use the bus 38 is assigned to the channel number selected by the corresponding one of the arbiters 41a to 41c. When the right to use the bus 38 is assigned in accordance with the first enable signals ENa1, ENb1, and ENc1 to any one of the channel numbers selected by the intra-level arbiters 41a to 41c, the priority order of the channel numbers is changed using a given system, e.g., the round-robin system in an embodiment.

Each of the intra-level arbiters 41a to 41c stores the signal selection information. The signal selection information includes at least one channel number. The signal selection information in the intra-level arbiters 41a to 41c is set to include the priority order for the arbitrations. The intra-level arbiters 41a to 41c arbitrate the write request signals corresponding to the channel numbers set for the intra-level arbiters 41a to 41c to generate valid signals SE1 to SE3, respectively, that indicate whether or not the requests are present. The intra-level arbiters 41a to 41c output the channel numbers corresponding to the results of the arbitrations in response to enable signals (determination signals). The intra-level arbiters 41a to 41c change the priorities of the signal selection information in accordance with the first enable signals ENa1, ENb1, and ENc1.

The arbitration function part 31a includes two priority-flag generators 42a and 42b corresponding to the set levels. When two or more request signals are present, the priority-flag generators 42a and 42b generate priority flags that indicate whether the request signals of the corresponding levels may be selected or whether the request signal of the other level may be selected. When the request signals of the levels other than the lowest-priority level are not selected, the request signal of the lowest-priority level is automatically selected. Therefore, the priority-flag generators are provided to correspond to the levels other than the lowest-priority level.

The first enable signal ENa1 and the second enable signal ENa2 are input to the priority-flag generator 42a. The first enable signal ENa1 indicates whether or not the right to use the bus 38 is assigned to the request (signal or channel number) of the level to which the priority-flag generator 42a corresponds. The second enable signal ENa2 indicates whether or not the right to use the bus 38 is assigned to the request (signal or channel number) of another level. In other words, the priority-flag generator 42a confirms through the first enable signal ENa1 that the right to use the bus 38 is reserved for the channel number corresponding to the highest-priority level. The priority-flag generator 42a confirms through the second enable signal ENa2 that the right to use the bus 38 is reserved for the channel number corresponding to another priority level. The first priority-flag generator 42a corresponds to the highest-priority level. Thus, the first priority-flag generator 42a checks whether the right to use the bus 38 is assigned to the channel number corresponding to the highest-priority level or whether the right to use the bus 38 is assigned to the channel number corresponding to another level lower than the highest-priority level. The priority-flag generator 42a includes a count function and counts how many times the right to use the bus 38 is assigned to each level. Further, the priority-flag generator 42a generates a priority flag SP1 based on the count values.

The priority flag SP1 may be a signal that has two values, for example. When the priority flag SP1 has a first value, e.g., "0," the channel number corresponding to the highest-priority level has a higher priority, and when the priority flag SP1 has a second value, e.g., "1," the channel number corresponding to another level has a higher priority.

Similarly to the first priority-flag generator 42a, the first enable signal ENb1 and a second enable signal ENb2 are input to the second priority-flag generator 42b. The first enable signal ENb1 indicates whether or not the right to use the bus 38 is assigned to the request (signal or channel number) of the second priority level to which the priority-flag generator 42b corresponds. The second enable signal ENb2 indicates whether or not the right to use the bus 38 is assigned for the request (signal or channel number) of another level. The second priority-flag generator 42b generates a priority flag SP2 based on the first enable signal ENb1 and the second enable signal ENb2.

As described above, the first priority-flag generator 42a generates the priority flag SP1 for indicating whether the level to which the first priority-flag generator 42a corresponds, e.g., the highest-priority level may be selected or whether another level, e.g., the level lower in priority than the highest-priority level may be selected. Similarly, the second priority-flag generator 42b generates the priority flag SP2 for indicating whether the second level to which the second priority-flag generator 42b corresponds may be selected or whether another level may be selected. The first enable signal ENa1 input to the first priority-flag generator 42a indicates whether the highest-priority level may be selected as another level. Accordingly, the second priority-flag generator 42b generates the priority flag SP2 for indicating whether the second level may be selected or whether another level lower than the second level may be selected.

The arbitration function part 31a includes two inter-level arbiters 43a and 43b corresponding to the set levels.

The valid signal SE1 output from the first intra-level arbiter 41a, the priority flag SP1 output from the first priority-flag generator 42a, and an output signal SE21 from an OR circuit 46 are input to the first inter-level arbiter 43a. A valid signal SE2 output from the second intra-level arbiter 41b and an valid signal SE3 output from the third intra-level arbiter 41c are input to the OR circuit 46. The OR circuit 46 generates the output signal SE21 by performing OR operations to the valid signals SE2 and SE3. The output signal SE21 indicates that a request signal that becomes valid to at least either one of the second intra-level arbiter 41b and the third intra-level arbiter 41c is input. That is, the output signal SE21 is a valid signal for indicating that a request signal(s) valid for either or both of the levels lower than the level set for the inter-level arbiter 43a is (are) present.

When either the valid signal SE1 or the valid signal SE2 indicates that a valid request is present, the first inter-level arbiter 43a outputs the valid signal indicating that the valid request is present as the inter-level arbitration signal SA1. Further, when both of the valid signals SE1 and SE2 indicate that the valid requests are present, that is, the valid signals SE1 and SE2 conflict, the first inter-level arbiter 43a selects either the valid signal SE1 or the valid signal SE2 in accordance with the priority flag SP1 and outputs the selected valid signal as the inter-level arbitration signal SA1. In other words, in accordance with the priority flag SP1, the first inter-level arbiter 43a selects the valid signal SE1 when the level to which the first inter-level arbiter 43a corresponds is selected or selects the valid signal SE2 when the level to which the first inter-level arbiter 43a corresponds is not selected, that is, the other levels are selected.

FIG. 4 illustrates operations of the first inter-level arbiter 43a. In FIG. 4, "PRIORITY FLAG" represents the priority flag SP1 output from the first priority-flag generator 42a, "VALID SIGNAL 1" represents the valid signal SE1 output from the first intra-level arbiter 41a, and "VALID SIGNAL 2" represents a result obtained by performing a logical operation on the valid signal SE2 and the valid signal SE3 by the OR circuit 46. When the "PRIORITY FLAG" is "0," it is indicated that the upper level is selected, and when the "PRIORITY FLAG" is "1," it is indicated that the lower level is selected. In the columns of "VALID SIGNAL 1" and "VALID SIGNAL 2," "1" indicates that the requests are issued from the set DMA channel and "0" indicates that no requests are present.

Accordingly, when the "VALID SIGNAL 1" and the "VALID SIGNAL 2" are both "1," it is indicated that the requests conflict among the levels. In such a case, the inter-level arbiter 43a selects the "VALID SIGNAL 1" in accordance with the priority flag "0" or selects the "VALID SIGNAL 2" in accordance with the priority flag "1."

Similarly, the valid signal SE2 output from the second intra-level arbiter 41b, the priority flag SP2 output from the second priority-flag generator 42b, and the valid signal SE3 output from the third intra-level arbiter 41c are input to the second inter-level arbiter 43b. The second inter-level arbiter 43b selects either one of the valid signals SE2 and SE3 in accordance with the priority flag SP2 and outputs the selected valid signal as the inter-level arbitration signal SA2.

The inter-level arbitration signals SA1 and SA2 output from the inter-level arbiters 43a and 43b are input to a channel determination part 44. Channel numbers SN1 to SN3 output from the intra-level arbiters 41a to 41c are further input to the channel determination part 44. The channel determination part 44 determines which one of the channel numbers SN1 to SN3 may obtain the right to use the bus 38 in accordance with the inter-level arbitration signals SA1 and SA2 and outputs the determined channel number to an interface circuit 45. The interface circuit 45 outputs the input channel number to the memory controller 33 in FIG. 2.

FIG. 5 illustrates operations of the channel determination part 44. In FIG. 5, the "INTER-LEVEL ARBITRATION SIGNAL 1" represents the arbitration signal SA1 output from the first inter-level arbiter 43a, the "INTER-LEVEL ARBITRATION SIGNAL 2" represents the arbitration signal SA2 output from the second inter-level arbiter 43b, and the "VALID SIGNAL 3" represents the valid signal SE3 output from the third intra-level arbiter 41c. In the columns of the "INTER-LEVEL ARBITRATION SIGNAL 1" and the "INTER-LEVEL ARBITRATION SIGNAL 2," "1" indicates that the channel number of the corresponding priority level is valid, in other words, the request is present.

Thus, the "INTER-LEVEL ARBITRATION SIGNAL 1" and/or "INTER-LEVEL ARBITRATION SIGNAL 2" corresponding to the upper levels is (are) "1," the right to use the bus 38 is assigned to the channel number corresponding to the upper level. Alternatively, the "INTER-LEVEL ARBITRATION SIGNAL 1" and "INTER-LEVEL ARBITRATION SIGNAL 2" are "0," the right to use the bus 38 is assigned to the channel number corresponding to the lower level, that is, the lowest-priority level.

The channel determination part 44 generates the enable signals ENa1 to ENc1 that indicate whether or not the right to use the bus 38 is assigned to each of the channel numbers SN1 to SN3. The enable signals ENa1, ENb1, and ENc1 are output to the intra-level arbiters 41a to 41c of the corresponding levels, respectively.

The enable signal ENb1 corresponding to the second level and the enable signal ENc1 corresponding to the third level (the lowest level) are output to an OR circuit 47. The OR circuit 47 outputs the signals generated through OR operations of the signals ENb1 and ENc1 as the second enable signal ENa2 corresponding to the highest level. The enable signal ENc1 corresponding to the third level indicates that the channel number corresponding to the other level is determined for the enable signal ENb1 corresponding to the second level. Thus, the enable signal ENc1 that is output from the channel determination part 44 and corresponds to the third level is input to the priority-flag generator 42b as the second enable signal ENb2 for indicating that the channel numbers for the other levels are determined in the second level.

Next, a configuration of the intra-level arbiter 41a is described.

Figure 6:
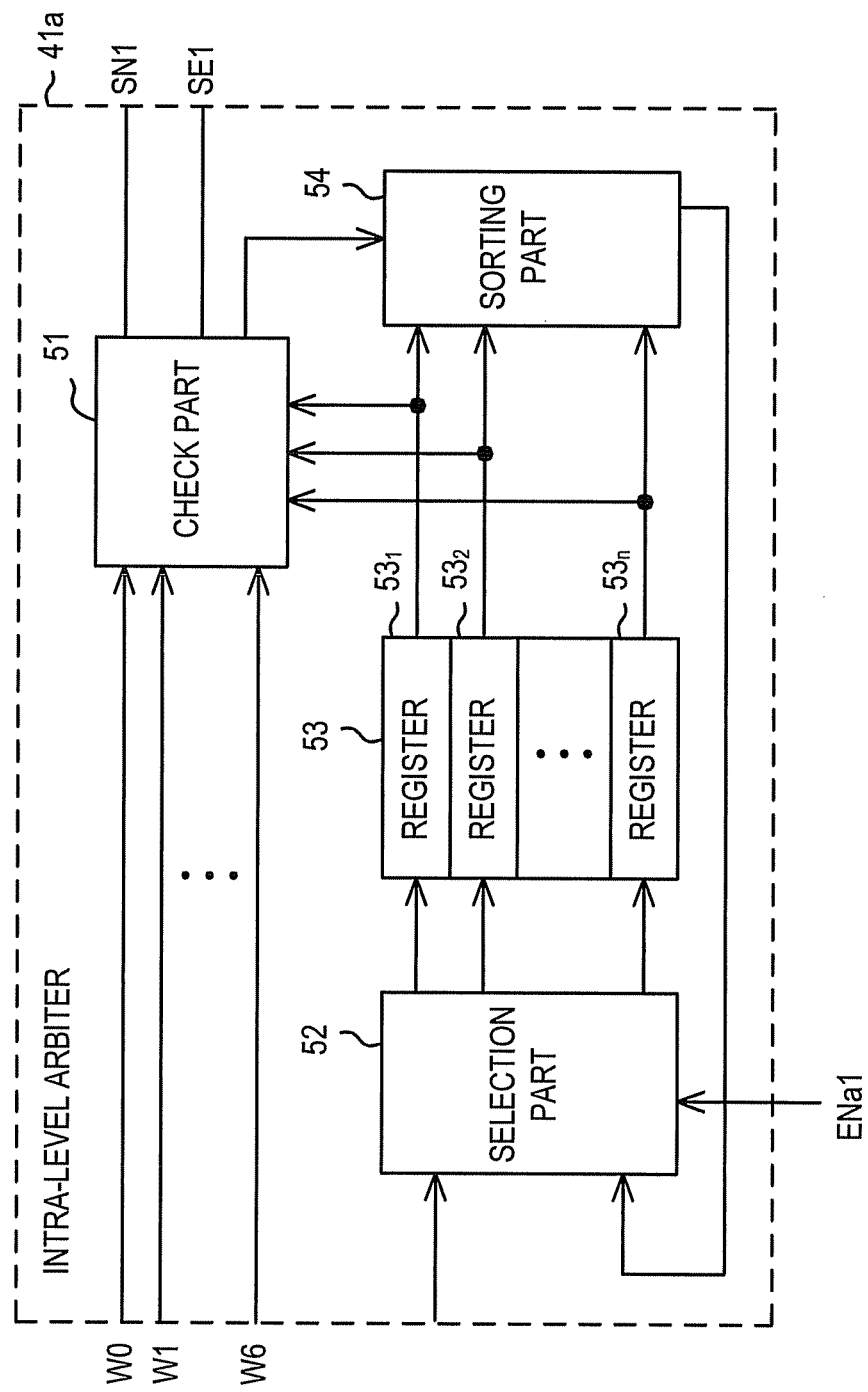
FIG. 6 illustrates an intra-level arbiter of an arbitration circuit as exemplarily shown in FIG. 3.

As illustrated in FIG. 6, the intra-level arbiter 41a includes a check part 51, a selection part 52, an information storage part 53, and a sorting part 54. A given number of request signals, e.g., all of the request signals W0 to W6 in an embodiment, are input to the check part 51. In addition, setting information stored in the information storage part 53 is input to the check part 51.

The information storage part 53 includes a plural number (number n) of registers $53_1$ to $53_n$, and the setting information or non-setting information is stored in each of the registers $53_1$ to $53_n$. The setting information includes the channel numbers of the DMA channels (processing parts) that output the request signals allocated to the intra-level arbiter 41a, which are part of the request signals W0 to W6 input to the check part 51. The non-setting information includes values that indicate that the channel numbers are not set. Since the information storage part 53 includes the registers $53_1$ to $53_n$, a plurality of registers may have the same channel number. The setting information and non-setting information are written by the CPU 35 in FIG. 2 through the selection part 52.

The CPU 35 performs initialization at power-up. The channel numbers included in the setting information are referred to as set channel values. The registers $53_1$ to $53_n$ output the information (values) stored in the registers $53_1$ to $53_n$. The check part 51 checks for each of service periods (periods for which the use of the bus 38 is allowed) whether or not the request for the right to use the bus 38 is issued from the DMA channel set for the priority level of the intra-level arbiter 41a in accordance with the request signals W0 to W6. When the request is issued, the check part 51 outputs the channel number SN1 corresponding to the requesting DMA channel and the valid signal SE1 for indicating that the request is present, e.g., the valid signal SE1 at the H level. When no requests are issued, the check part 51 outputs the valid signal SE1 for indicating that no requests are present, e.g., the valid signal SE1 at the L level.

For example, the check part 51 checks whether or not requests for the right to use the bus 38 are expressed by the request signals W0 to W6, e.g., whether or not the request signals W0 to W6 are at the H level. The check is performed using the results of the OR operations of the request signals W0 to W6. When the right to use the bus 38 is requested, the check part 51 sequentially compares the channel numbers of the request signals requesting the right to use the bus 38 with the set channel values output from the registers $53_1$ to $53_n$ and identifies the channel number that becomes the first to match the set channel value as the arbitration result of the intra-level arbiter 41a, e.g., the selected channel number. The check part 51 outputs the set channel number SN1 and the valid signal SE1 that indicates that the output channel number SN1 is valid. Further, the check part 51 outputs pointer information to the sorting part 54. The pointer information indicates the register in which the selected channel number, that is, the set channel value that became the first to match the channel number of the request signal, is stored.

The information stored in all of the registers $53_1$ to $53_n$ included in the information storage part 53 is input to the sorting part 54. The sorting part 54 is a shift register. The sorting part 54 sorts the information so that the information stored in the register that the input pointer information indicates may be stored in the last register and outputs the result to the selection part 52. For example, when the check part 51 selects the request from the DMA channel having the channel number corresponding to the set channel value stored in the second register $53_2$, the check part 51 outputs the pointer information indicating the second register $53_2$. The sorting part 54 stores the information stored in the third to n-th registers $53_3$ to $53_n$ in the second to (n−1)th registers $53_2$ to $53_{n-1}$ in accordance with the pointer information and shifts the information stored in the second register $53_2$ to store the information stored in the second register $53_2$ in the n-th register $53_n$, and outputs the shift result to the selection part 52.

The enable signal ENa1 is input to the selection part 52. The selection part 52 writes the information (setting information and non-setting information) input from the CPU 35 in FIG. 2 to the registers 53₁ to 53ₙ. The selection part 52 writes the information input from the sorting part 54 to the registers 53₁ to 53ₙ based on the enable signal ENa1 when the enable signal ENa1 indicates that the request from the priority level is accepted. The sorting part 54 sorts the channel numbers stored in the information storage part 53 using the round-robin system and the selection part 52 changes the priority order in the level.

Next, a configuration of the priority-flag generator 42a is described.

Figure 7:
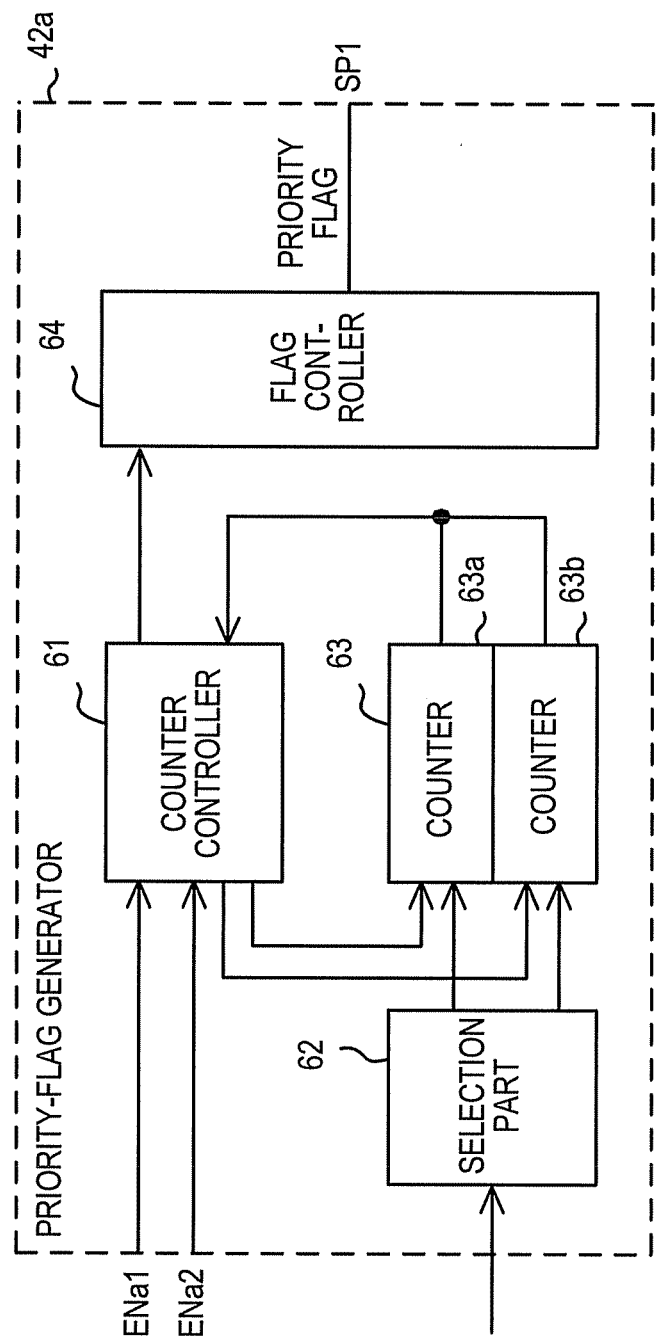
FIG. 7 illustrates a priority-flag generator of an arbitration circuit as exemplarily shown in FIG. 3.

As illustrated in FIG. 7, the priority-flag generator 42a includes a counter controller 61, a selection part 62, a counter 63, and a flag controller 64. The counter 63 includes a first counter 63a and a second counter 63b. The counters 63a and 63b may be up counters, for example. Count-up values are stored in each of the counters 63a and 63b by the CPU 35 in FIG. 2. The count-up values stored in the first counter 63a and the second counter 63b correspond to the priority order of the intra-level arbiter of the upper level, e.g., the first intra-level arbiter 41a and the intra-level arbiter of the lower level, e.g., the second intra-level arbiter 41b. The count-up values may be "4" and "3," for example. The counters 63a and 63b count up by +1 in response to the count-up signals output from the counter controller 61. When the count values match the count-up values, the counters 63a and 63b output match signals to the counter controller 61 and clear the count values (makes the count values "0").

The first enable signal ENa1 and the second enable signal ENa2 are input to the counter controller 61. The counter controller 61 outputs the count-up signal to the first counter 63a in response to the first enable signal ENa1 and outputs the count-up signal to the second counter 63b in response to the second enable signal ENa2. The first enable signal ENa1 indicates that the channel number of the upper level, e.g., the first level corresponding to the first intra-level arbiter 41a, is selected when the conflict occurs among the requests from the levels. The second enable signal ENa2 indicates that the channel number of the lower level, e.g., the second level that is lower than the level corresponding to the first intra-level arbiter 41a, is selected when the conflict occurs among the requests from the levels. Accordingly, the count value of the first counter 63a indicates the number of the requests from the upper level, which are selected through the arbitration, and the count value of the second counter 63b indicates the number of the requests from the lower level, which are selected through the arbitration.

The counter controller 61 outputs a flag control signal to the flag controller 64 based on the match signals output from the counters 63a and 63b. The flag controller 64 generates the priority flag SP1 in response to the flag control signal. For example, the counter controller 61 allows the flag controller 64 to output the priority flag having a value of, for example, "0" or at the L level, which gives the upper level a higher priority in accordance with the flag control signal, while allowing the first counter 63a to count up in response to the first enable signal ENa1. The first inter-level arbiter 43a in FIG. 3 selects the valid signal SE1 corresponding to the upper level in response to the priority flag SP1 having a value of "0" when the valid signals SE1 and SE2 indicating the requests are issued from the first intra-level arbiter 41a and the second intra-level arbiter 41b, respectively, are output. The first inter-level arbiter 43a outputs the selected valid signal as the valid signal SA1 for indicating that the request signals from the upper level and the lower level are arbitrated.

Further, when the first counter 63a outputs the match signal, the counter controller 61 allows the flag controller 64 to output the priority flag having a value of, for example, "1" or at the H level, which gives the lower level a higher priority in accordance with the flag control signal. The first inter-level arbiter 43a in FIG. 3 selects the valid signal SE2 of the lower level in response to the priority flag SP1 having a value of "1" when the valid signals SE1 and SE2 indicating the requests are issued from the first intra-level arbiter 41a and the second intra-level arbiter 41b are output. The first inter-level arbiter 43a outputs the selected valid signal as the valid signal SA1 that indicates that the request signals from the upper level and the lower level are arbitrated.

Accordingly, the inter-level arbiter 43a selects the requests from the upper level and the lower level for the times according to the count values set for the first counter 63a and the second counter 63b of the priority-flag generator 42a, respectively. In other words, the inter-level arbiter 43a selects not only the requests from the upper level but also the requests from the lower level in accordance with the ratio of the count values set for the first and second counters 63a and 63b.

Since the configuration of the second intra-level arbiter 41b is substantially the same as the configuration of the first intra-level arbiter 41a, the figure thereof is omitted in the accompanying drawings.

The information storage part 53 of the second intra-level arbiter 41b stores at least one channel number. Therefore, the priority levels for the DMA channels having the same channel numbers may be set easily by setting the channel numbers for the second intra-level arbiter 41b. In addition, the priority levels for the DMA channels having the same channel numbers may be changed easily by canceling the channel numbers set for the first intra-level arbiter 41a and setting the same channel numbers for the second intra-level arbiter 41b.

Each of the information storage parts 53 of the intra-level arbiter 41a and 41b includes a plurality of registers. For example, the channel number having the same value may be set for the registers in the first intra-level arbiter 41a. Then, the right to use the bus 38 is assigned to the DMA channels having the same channel number for the times corresponding to the number of the registers for which the same channel number are set. In other words, the priority order in the level may be changed in accordance with the number of the set registers.

The channel number having the same value may be set for another priority level. In other words, the channel number having the same value may be set for the first intra-level arbiter 41a and the second intra-level arbiter 41b. Then, similarly to the above, the right to use the bus 38 is assigned to the DMA channels having the same channel number for the times corresponding to the number of the set registers.

Since the configuration of the third intra-level arbiter 41c is substantially the same as the configuration of the first intra-level arbiter 41a, the figure thereof is omitted in the accompanying drawings.

The third intra-level arbiter 41c operates similarly to the second intra-level arbiter 41b. That is, the priority order may be changed easily by setting the channel numbers for each of the intra-level arbiters 41a to 41c. The priority order may be changed easily by changing the set channel numbers. The DMA channel having the same channel numbers may not obtain the right to use the bus 38 when no channel numbers are set for the first to third intra-level arbitration parts 41a to 41c with respect to the processing parts that are inactive at the time. In other words, since the right to use the bus 38 as part of resources is not assigned to the undesired DMA channels, the right to use the bus 38 may be more likely to be assigned to the desired DMA channels.

Since the configuration of the second priority-flag generator 42b is substantially the same as the configuration of the first priority-flag generator 42a, the figure thereof is omitted in the accompanying drawings. The first and second counters 63a and 63b of the second priority-flag generator 42b store the values for accepting the requests from the upper level and the requests from the lower level similarly to the first and second counters 63a and 63b of the first priority-flag generator 42a. Accordingly, as illustrated in FIG. 3, the second inter-level arbiter 43b to which the priority flag SP2 generated by the second priority-flag generator 42b is input selects not only the requests from the upper level but also the requests from the lower level in accordance with the ratio of the count values set for the first and second counters 63a and 63b. Even when the requests are continuously issued from the processing part corresponding to the DMA channels higher in priority, the right to use the bus 38 is assigned to the DMA channel having the channel number set for the third intra-level arbiter 41c lowest in priority. In other words, the right to use the bus 38 is assigned to all of the DMA channels having the channel numbers set for the intra-level arbiters 41a to 41c.

According to an embodiment, when the requests from the priority levels conflict, the priority-flag generators 42a and 42b count the first enable signals ENa1 and ENb1 that indicate that the requests from the upper level are accepted and the second enable signals ENa2 and ENb2 that indicate that the requests from the lower level are accepted. The priority-flag generators 42a and 42b invert the priority flags SP1 and SP2 when the count values reach the set count values, and select the requests from the other level. The inter-level arbiter selects either the valid signal of the upper level or the valid signal of the lower level to output the selected valid signal as the inter-level arbitration signal. The channel determination part assigns the right to use the bus 38 to the channel numbers of the levels corresponding to the inter-level arbitration signals SA1 and SA2, which are included in the channel numbers SN1 to SN3 output from the intra-level arbiters 41a to 41c.

As a result, when the requests from two or more priority levels conflict, the requests from one of the levels are accepted for the times corresponding to the count value and then the requests from the other level(s) become valid. Thus, since the requests from the lower levels become valid after the requests from the firstly-chosen level are accepted for the times corresponding to the count value even when the requests are successively issued from the higher-priority levels, the requests from the lower levels may be surely accepted.

According to an aspect of an embodiment, each of the intra-level arbiters 41a to 41c for which the priority levels different from one another are set include the registers $53_1$ to $53_n$ for storing the channel numbers corresponding to the DMA channels and arbitrate the requests of the channel numbers stored in the registers $53_1$ to $53_n$. Thus, the priority order of the DMA channels may be changed by changing the channel numbers stored in the registers $53_1$ to $53_n$.

According to an aspect of an embodiment, the registers $53_1$ to $53_n$ of the intra-level arbiters 41a to 41c may store the same channel number. Depending on the numbers of the stored overlapping channel numbers, the right to use the bus 38 may be assigned to the DMA channels having the overlapping channel numbers. Accordingly, the priority order may be set for each of the DMA channels even when the DMA channels belong to one priority level.

According to an aspect of an embodiment, depending on the desired operation(s), the registers $53_1$ to $53_n$ of the intra-level arbiters 41a to 41c are set so as not to store the channel numbers corresponding to the processing parts 21 to 28 that are undesired to operate. In other words, since the bus arbitration is not performed for the inactive processing parts, the right to use the bus 38 as part of the limited resources may be assigned effectively.

An embodiment may be modified as described below.

Figure 8:
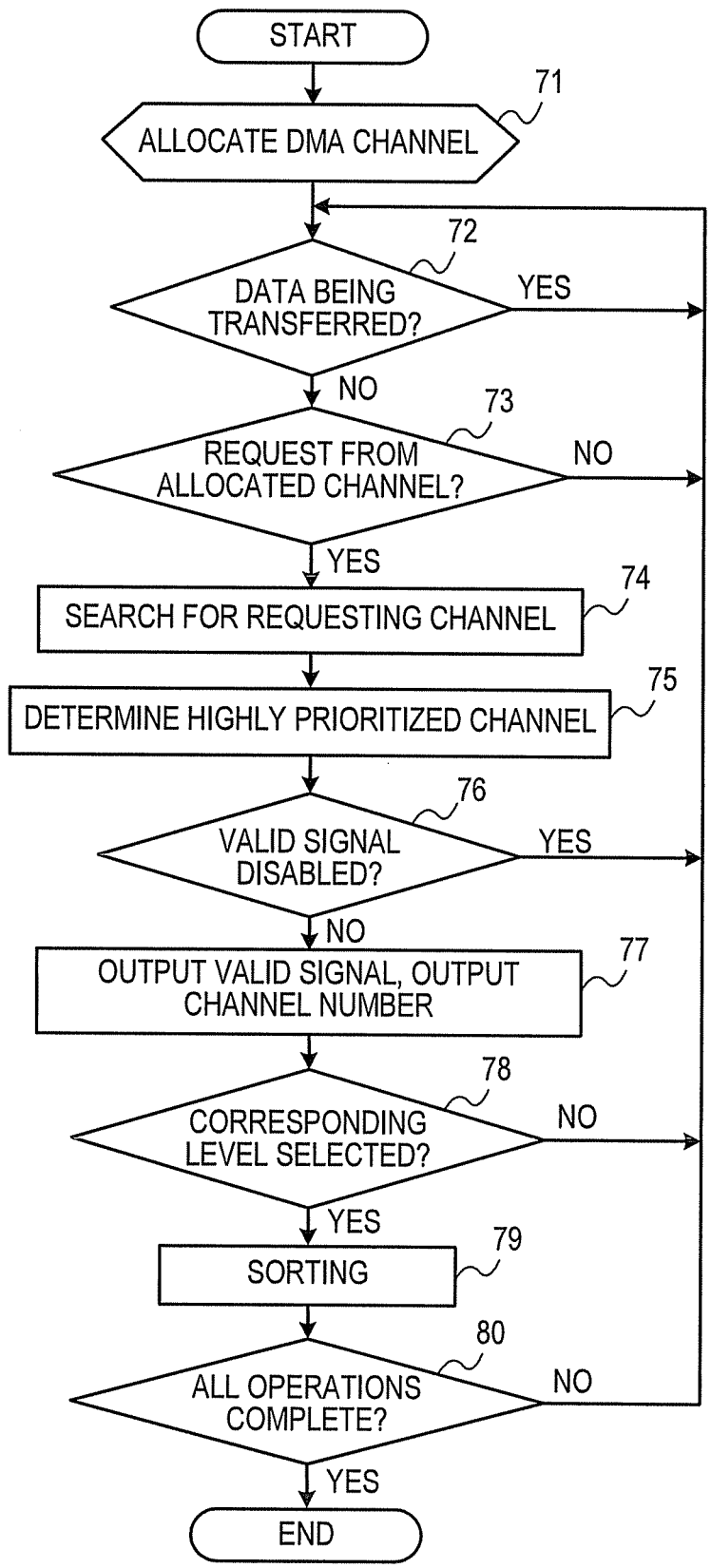
FIG. 8 illustrates operation(s) of an intra-level arbiter of an arbitration circuit as exemplarily shown in FIG. 3.

In an embodiment, an arbitration may be performed by running software in which the arbitration function parts 31a to 31d are stored. For example, FIG. 8 is a flowchart illustrating operations performed by an intra-level arbiter.

The DMA channels are allocated to the intra-level arbiters, that is, the channel numbers are set (Operation 71). The inter-level arbiter checks whether or not the data transfer is being performed, that is, whether or not the bus is busy (Operation 72), and waits for the completion of the data transfer when the data transfer is being performed. When the data transfer is complete, the inter-level arbiter checks whether or not requests from the allocated channels are present (Operation 73), and returns to Operation 72 when no requests are present.

When the requests from the channels are present, the intra-level arbiter searches for requesting channel(s) (Operation 74) and determines the channel to be highly prioritized (Operation 75). The intra-level arbiter checks whether or not the output of the valid signal is disabled (inhibited) with respect to the intra-level arbiter (Operation 76). When the output of the valid signal is not disabled, the valid signal and the channel number are output (Operation 77). The intra-level arbiter checks whether or not the corresponding level is selected, that is, whether or not the right to use the bus is assigned to the channel numbers corresponding to a level (Operation 78), and sorts the channel numbers when the level is selected (Operation 79). The intra-level arbiter checks whether or not all of the operations desired for a cycle of service are complete (Operation 80), and returns to Operation 72 at the time of the completion of the operations to wait for the next request.

Figure 9:
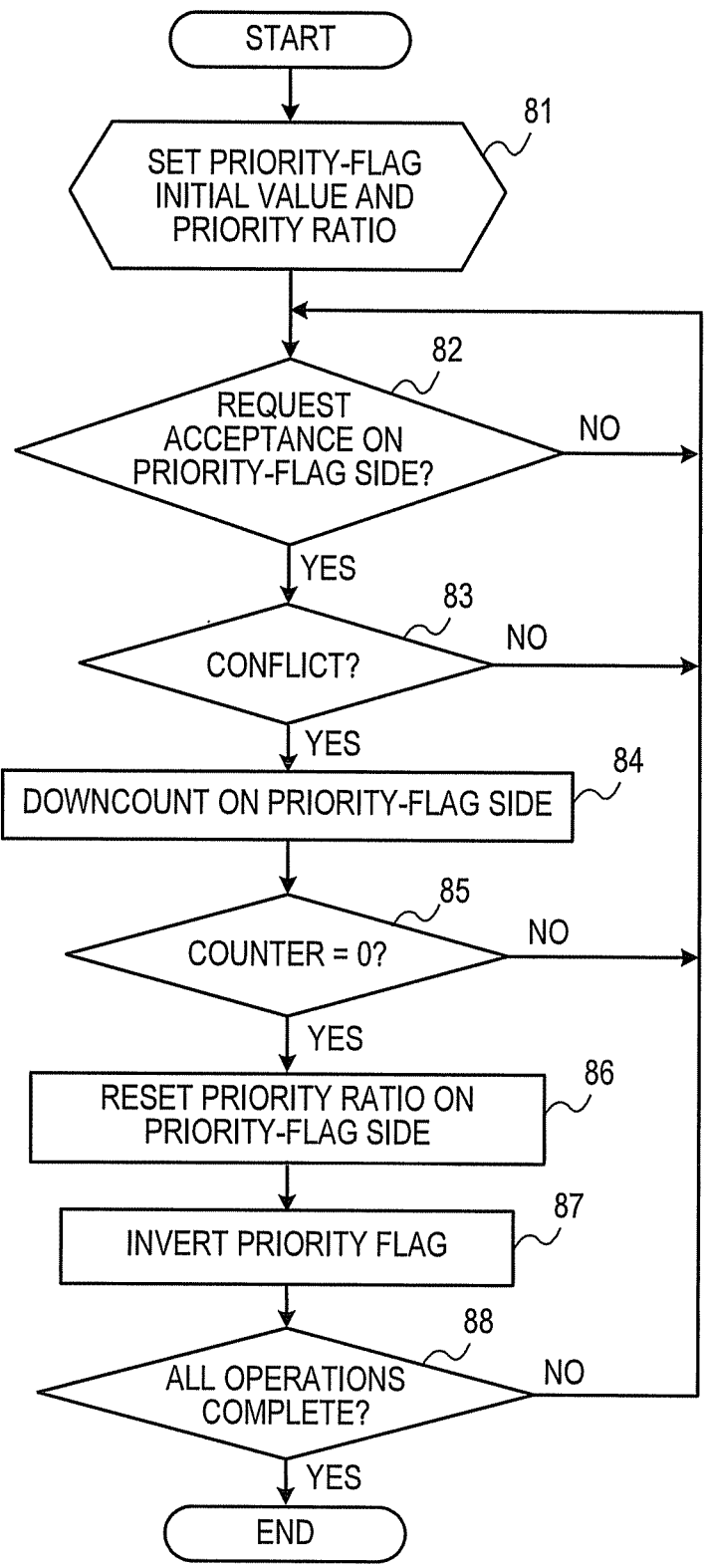
FIG. 9 illustrates operation(s) of a priority-flag generator of an arbitration circuit as exemplarily shown in FIG. 3.

FIG. 9 is a flowchart illustrating operation(s) performed by a priority-flag generator.

A priority-flag initial value and a count value that is hereinafter referred to also as a priority ratio are set for the priority-flag generator (Operation 81). The priority-flag generator checks whether or not a request acceptance is present on the priority-flag side, that is, at the level (the upper or lower level) being selected at the time (Operation 82). When the request acceptance is present, the priority-flag generator checks whether or not a conflict occurs (Operation 83). The priority-flag generator counts down the count value on the priority-flag side (Operation 84) when the requests conflict. The priority-flag generator checks whether or not the count value is "0," that is, whether or not a set number of requests are accepted (Operation 85), and resets the priority ratio (the count value) on the priority-flag side when the count value is "0" (Operation 86). The priority-flag generator inverts the priority flag, that is, changes the priority flag so that the priority order of the levels may change (Operation 87). The priority-flag generator checks whether or not all of the operations desired for a cycle of service (Operation 88), and returns to Operation 72 at the time of the completion of the operations to wait for the next request.

Thus, similarly to the embodiment described above operation(s) by software may also ensure that the low-priority requests are accepted.

The embodiment(s) are described herein with a digital still camera, as an example of the electronic apparatuses, however, any other kind of electronic apparatus may be used when the apparatus performs arbitrations of request signals.

In an embodiment, the processing parts 21 to 28 are included and the arbitration circuit 31 arbitrates the request signals from the processing parts 21 to 28, however, the number of the processing parts, the operations performed by the processing parts, and the like may be changed as desired.

In an embodiment, the arbitration circuit 31 includes the arbitration function parts 31a and 31b that arbitrate the write request signals W0 to W6. However, a number of the arbitration function parts of the arbitration circuit 31 may be one, or three or more. Similarly, the arbitration circuit 31 includes the arbitration function parts 31c and 31d that arbitrate the read request signals R1 to R7. However, the number of the arbitration function parts of the arbitration circuit 31 may be one, or three or more.

In an embodiment, three priority levels are set, that is, the three intra-level arbiters 41a to 41c are provided for each of the arbitration function parts 31a to 31d. However, the numbers of the priority levels or the intra-level arbiters of each of the arbitration function parts 31a to 31d may be two, or four or more. The circuit configurations of the priority-flag generators and the like may be changed based on the desired settings.

In an embodiment, the operations of the intra-level arbiters 41a to 41c may be stopped (adjusted or changed) as desired. For example, operation inhibiting signals may be provided from the CPU 35 to each of the intra-level arbiters 41a to 41c. Each of the intra-level arbiters 41a to 41c stops the arbitration operation in response to the operation inhibiting signal at a first level, e.g., the H level, or performs the arbitration operation in response to the operation inhibiting signal at a second level, e.g., the L level. Through the configurations described above, a priority order of the requests from the channels, which are set for the given levels, may be changed, for example, the requests may be selected as desired. Since the inter-level arbiters 43a and 43b may omit the arbitration operations for the given levels, the check part 51 in FIG. 6 may set the valid signal SE1 to be disabled, that is, to be at a signal level indicating that the signal SE1 is invalid, in response to the signal.

According to an aspect of an embodiment, lower-priority requests may be accepted for a given period.

According to an aspect of an embodiment, lower-priority requests may be accepted for a given period even when higher-priority requests are successively issued, for example.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention, the scope of which is defined in the claims and their equivalents.

What is claimed is:

1. An arbitration device, comprising:
a memory; and
at least one processor connected with the memory, configured to:
   output a first arbitration signal corresponding to an access request in accordance with a first priority and output a first valid signal indicating output of the first arbitration signal,
   output a second arbitration signal corresponding with an access request in accordance with a second priority and output a second valid signal indicating output of the second arbitration signal,
   select one of the first arbitration signal and the second arbitration signal and output one of a first enable signal indicating a selection of the first arbitration signal and a second enable signal indicating a selection of the second arbitration signal,
   count, using a first counter, a value associated with the first enable signal;
   count, using a second counter, a value associated with the second enable signal;
   generate a first priority flag based on an output of the first counter and an output of the second counter, the first priority flag including a first state indicating the access request corresponding to the first arbitration signal has priority and a second state indicating the access request corresponding to the second arbitration signal has priority; and
   select one of the first valid signal and the second valid signal based on a state of a generated first priority flag,
wherein selection of one of the first arbitration signal and the second arbitration signal corresponds with a selection of one of the first valid signal and the second valid signal.

2. The arbitration device according to claim 1,
wherein the first valid signal with a first voltage is output when outputting the first arbitration signal is selected and the first valid signal with a second voltage is output when the first arbitration signal is not selected, and
the second valid signal with the first voltage is output when the second arbitration signal is selected and the second valid signal with the second voltage is output when the second arbitration signal is not selected.

3. The arbitration device according to claim 2, wherein
the first valid signal is output when the first priority flag is the first state,
the second voltage is output when the first priority flag is the second state and the second valid signal is the first voltage, and
the first voltage is output when the first priority flag is the second state, the second valid signal is the second voltage and the first valid signal is the first voltage.

4. The arbitration device according to claim 1, wherein the first priority flag is generated in the first state during a count operation of the first counter and the first priority flag is generated in the second state during a count operation of the second counter.

5. The arbitration device according to claim 1, wherein the first counter outputs a first match signal when the value associated with the first enable signal matches a first count-up value and the second counter outputs a second match signal when the value associated with the second enable signal matches a second count-up value.

6. An arbitration method, comprising:
outputting a first arbitration signal corresponding to an access request in accordance a first priority and outputting a first valid signal indicating output of the first arbitration signal;
outputting a second arbitration signal corresponding to an access request in accordance with a second priority and outputting a second valid signal indicating output of the second arbitration signal;
selecting one of the first arbitration signal and the second arbitration signal and outputting one of a first enable signal indicating a selection of the first arbitration signal and a second enable signal indicating a selection of the second arbitration signal;
counting a value associated with the first enable signal by a first counter;
counting a value associated with the second enable signal by a second counter;
generating a first priority flag based on an output of the first counter and an output of the second counter, the first priority flag including a first state indicating the access request corresponding to the first arbitration signal has priority and a second state indicating the access request corresponding to the second arbitration signal has priority; and
selecting one of the first valid signal and the second valid signal based on a state of a generated first priority flag,
wherein selection of one of the first arbitration signal and the second arbitration signal corresponds with a selection of one of the first valid signal and the second valid signal.

7. The arbitration method according to claim 6, wherein the first valid signal is output with a first voltage when the first arbitration signal is selected and the first valid signal is output with a second voltage when the first arbitration signal is not selected, and
the second valid signal is output with the first voltage when outputting the second arbitration signal is selected and the second valid signal is output with the second voltage when the second arbitration signal is not selected.

8. The arbitration method according to claim 6, comprising:
outputting a first match signal when the value associated with the first enable signal matches a first count-up value; and
outputting a second match signal when the value associated with the second enable signal matches a second count-up value.

9. An electronic apparatus, comprising:
an acquisition part configured to acquire information;
a plurality of processing parts configured to perform a plurality of processes for the information;
a memory configured to store the information for which the plurality of processes are performed;
a display configured to display the information for which the plurality of processes are performed;
a first arbiter configured to output a first arbitration signal corresponding to an access request associated with a first priority and output a first valid signal indicating output of the first arbitration signal;
a second arbiter configured to output a second arbitration signal corresponding to an access request associated with a second priority and output a second valid signal indicating output of the second arbitration signal;
a selection part configured to select one of the first arbitration signal and the second arbitration signal and output one of a first enable signal indicating a selection of the first arbitration signal and a second enable signal indicating a selection of the second arbitration signal;
a first counter configured to count the first enable signal;
a second counter configured to count the second enable signal; and
a flag generator configured to generate a first priority flag based on an output of the first counter and an output of the second counter, the first priority flag including a first state indicating the access request corresponding to the first arbitration signal has priority and a second state indicating the access request corresponding to the second arbitration signal has priority; and
a first level arbiter configured to select one of the first valid signal and the second valid signal based on a state of a generated first priority flag,
wherein the selection part selects one of the first arbitration signal and the second arbitration signal based on an output of the first level arbiter.

10. The electronic apparatus according to claim 9, wherein the first arbiter outputs the first valid signal with a first voltage when the first arbitration signal is selected and outputs the first valid signal with a second voltage when the first arbitration signal is not selected, and
the second arbiter outputs the second valid signal with the first voltage when the second arbitration signal is selected and outputs the second valid signal with the second voltage when the second arbitration signal is not selected.

11. The electronic apparatus according to claim 10, wherein
the first level arbiter outputs the first valid signal when the first priority flag is the first state,
outputs the second voltage when the first priority flag is the second state and the second valid signal is the first voltage, and
output the first voltage when the first priority flag is the second state, the second valid signal is the second voltage and the first valid signal is the first voltage.

12. The electronic apparatus according to claim 9, wherein the flag generator generates the first priority flag with the first state during a count operation of the first counter and generates the second priority flag with the second state during a count operation of the second counter.

13. The electronic apparatus according to claim 9, wherein the first counter outputs a first match signal when the value associated with the first enable signal matches a first count-up value and the second counter outputs a second match signal when the value associated with the second enable signal matches a second count-up value.

14. A compute implemented method of arbitration, comprising:
- receiving access requests that result in a conflict; and
- outputting a first arbitration signal corresponding to an access request associated with a first priority and outputting a first valid signal indicating output of the first arbitration signal;
- outputting a second arbitration signal corresponding to an access request associated with a second priority and outputting a second valid signal indicating output of the second arbitration signal;
- selecting one of the first arbitration signal and the second arbitration signal and output one of a first enable signal indicating a selection of the first arbitration signal and a second enable signal indicating a selection of the second arbitration signal;
- counting a value associated with the first enable signal by a first counter;
- counting a value associated with the second enable signal by a second counter;
- generating a first priority flag based on an output of the first counter and an output of the second counter, the first priority flag including a first state indicating the access request corresponding to the first arbitration signal has priority and a second state indicating the access request corresponding to the second arbitration signal has priority; and
- selecting one of the first valid signal and the second valid signal based on a state of a generated first priority flag,
- wherein selection of one of the first arbitration signal and the second arbitration signal is based on a selected valid signal.

15. The computer-implemented method according to claim 14, comprising:
- outputting a first match signal when the value associated with the first enable signal matches a first count-up value; and
- outputting a second match signal when the value associated with the second enable signal matches a second count-up value.

* * * * *

UNITED STATES PATENT AND TRADEMARK OFFICE
CERTIFICATE OF CORRECTION

| | | |
|---|---|---|
| PATENT NO. | : 8,650,347 B2 | |
| APPLICATION NO. | : 12/540844 | |
| DATED | : February 11, 2014 | |
| INVENTOR(S) | : Okada | |

It is certified that error appears in the above-identified patent and that said Letters Patent is hereby corrected as shown below:

In the Claims

Column 17, Line 14, In Claim 6, after "accordance" insert -- with --.
Column 19, Line 1, In Claim 14, delete "compute implemented" and insert -- computer-implemented --, therefor.

Signed and Sealed this
Twenty-seventh Day of May, 2014

Michelle K. Lee
*Deputy Director of the United States Patent and Trademark Office*